United States Patent
Chen et al.

(10) Patent No.: US 11,791,110 B2
(45) Date of Patent: Oct. 17, 2023

(54) KEY STRUCTURE

(71) Applicant: Acer Incorporated, New Taipei (TW)

(72) Inventors: Hung-Chi Chen, New Taipei (TW); Cheng-Wen Hsieh, New Taipei (TW)

(73) Assignee: Acer Incorporated, New Taipei (TW)

(*) Notice: Subject to any disclaimer, the term of this patent is extended or adjusted under 35 U.S.C. 154(b) by 0 days.

(21) Appl. No.: 17/477,551

(22) Filed: Sep. 17, 2021

(65) Prior Publication Data

US 2022/0270832 A1     Aug. 25, 2022

(30) Foreign Application Priority Data

Feb. 19, 2021    (TW) ................................. 110105721

(51) Int. Cl.
    *H01H 3/12*          (2006.01)
    *H01H 9/52*          (2006.01)
    *G06F 1/20*          (2006.01)
    *G06F 3/02*          (2006.01)

(52) U.S. Cl.
CPC .............. *H01H 3/125* (2013.01); *G06F 1/20* (2013.01); *G06F 3/0202* (2013.01); *H01H 9/52* (2013.01)

(58) Field of Classification Search
CPC .......... H01H 3/125; H01H 9/52; H01H 13/70; H01H 13/7065; H01H 3/12; H01H 13/83; H01H 3/122; H01H 13/14; G06F 1/20; G06F 3/0202; G06F 3/02
See application file for complete search history.

(56) References Cited

U.S. PATENT DOCUMENTS

| | | | |
|---|---|---|---|
| 11,217,404 B1 * | 1/2022 | Hsieh | ..................... H01H 3/122 |
| 2003/0089588 A1 | 5/2003 | Chu | |

FOREIGN PATENT DOCUMENTS

| | | |
|---|---|---|
| CN | 101657870 | 2/2010 |
| TW | M443218 | 12/2012 |
| TW | I557763 | 11/2016 |
| TW | M567951 | 10/2018 |

* cited by examiner

*Primary Examiner* — Lheiren Mae A Caroc
(74) *Attorney, Agent, or Firm* — JCIPRNET

(57) ABSTRACT

A key structure including a base, a platform, a scissor structure, a heat conducting member, an elastic member, and a key cap is provided. The scissor structure is movably pivoted between the platform and the base. The heat conducting member is disposed on the platform. The elastic member is disposed on the base and is structurally in contact with the heat conducting member by passing through an opening of the platform. The key cap is disposed on the platform, and the heat conducting member is clamped between the key cap and the platform.

7 Claims, 5 Drawing Sheets

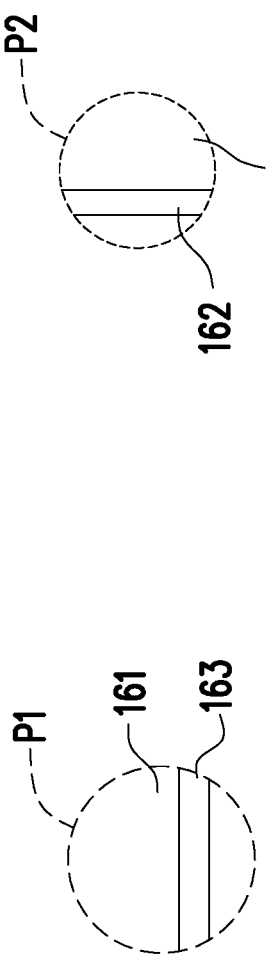
FIG. 3B
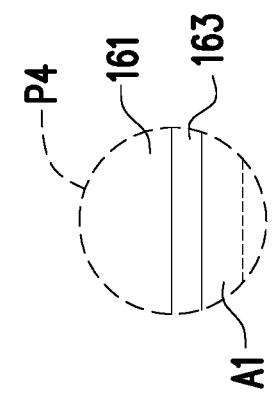
FIG. 3C
FIG. 3D
FIG. 3E

KEY STRUCTURE

CROSS-REFERENCE TO RELATED APPLICATION

This application claims the priority benefit of Taiwanese application no. 110105721, filed on Feb. 19, 2021. The entirety of the above-mentioned patent application is hereby incorporated by reference herein and made a part of this specification.

BACKGROUND

Technical Field

The disclosure relates to a key structure.

Description of Related Art

Currently, heat dissipation systems in notebook computers mainly dissipate heat by air-cooling, namely drawing in cold air from outside the body or exhausting hot air from inside the body using fans. However, current keyboard structures mainly include a membrane keyboard, in which the membrane interferes with heat transfer and the keyboard cannot be utilized for heat dissipation.

However, the heat dissipation paths as mentioned above are mostly concentrated on the side and the bottom of the body, and the keyboard on the body is not provided with such heat dissipation means. The keyboard in the notebook computer typically adopts a rubber dome for elastic restoration, and heat is thus likely to be concentrated in the contact region between the rubber dome and the key cap. When observed with an infrared camera, hot spots are obviously seen on the surface of each key of the keyboard, which is likely to cause users to perceive apparently higher temperature in the key caps of a specific (central) region when touching the key caps, resulting in an adverse tactile perception for the users when operating the keyboard.

SUMMARY

The disclosure provides a key structure that achieves heat dissipation effectiveness and aesthetic appearance.

According to the disclosure, a key structure includes a base, a platform, a scissor structure, a heat conducting member, an elastic member, and a key cap. The scissor structure is movably pivoted between the platform and the base. The heat conducting member is disposed on the platform. The elastic member is disposed on the base and is structurally in contact with the heat conducting member by passing through an opening of the platform. The key cap is disposed on the platform, and the heat conducting member is clamped between the key cap and the platform.

Based on the foregoing, the platform and the heat conducting member are further disposed between the elastic member and the key cap of the key structure. The elastic member is disposed on the base and is structurally in contact with the heat conducting member by passing through the opening of the platform, and therefore the heat at the base can be smoothly transferred to the heat conducting member through the elastic member. The scissor structure and platform form the basic structure to support the heat conducting member and the key cap. Accordingly, the key structure have an aesthetic appearance. At the same time, with the heat conducting member being in contact with the elastic member, heat is homogenized and then dissipated into the space where the key structure is located.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3B is a schematic enlarged view illustrating the region P1 of FIG. 3A.

FIG. 3C is a schematic enlarged view illustrating the region P2 of FIG. 3A.

FIG. 3D is a schematic enlarged view illustrating the region P3 of FIG. 3A.

FIG. 3E is a schematic enlarged view illustrating the region P4 of FIG. 3A.

DESCRIPTION OF THE EMBODIMENTS

Figure 1:
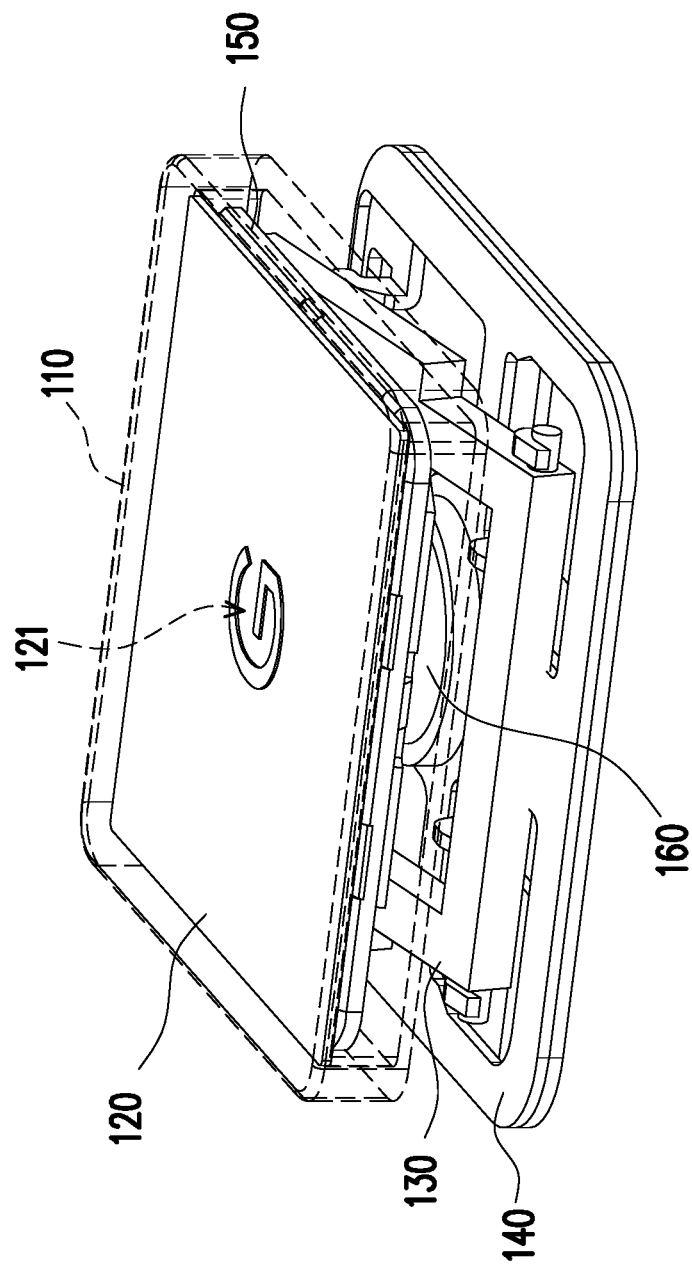
FIG. 1 is a schematic diagram of a key structure according to an embodiment of the disclosure.
Figure 2:
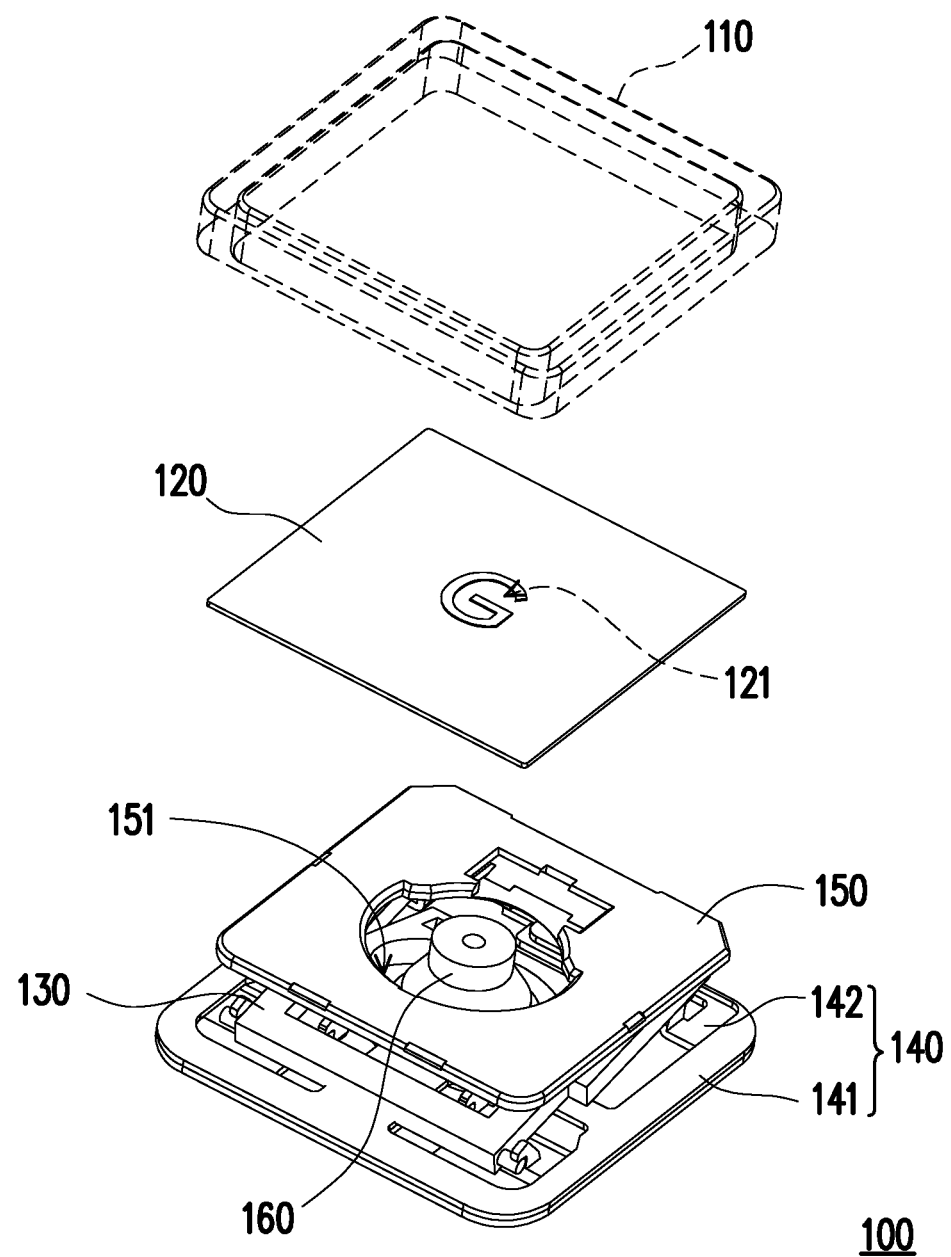
FIG. 2 is an exploded view of the key structure of FIG. 1.

FIG. 1 is a schematic diagram of a key structure according to an embodiment of the disclosure. FIG. 2 is an exploded view of the key structure of FIG. 1. With reference to FIG. 1 and FIG. 2 together, in this embodiment, a key structure 100 is adapted for an electronic device, serving as a user input interface for the electronic device to be accordingly controlled, and will be further described in subsequent embodiments. The key structure 100 includes a base 140, a platform 150, a scissor structure 130, a heat conducting member 120, an elastic member 160, and a key cap 110. The scissor structure 130 is movably pivoted between the base 140 and the platform 150. The heat conducting member 120 is disposed on the platform 150. The elastic member 160 is disposed on the base 140 and is structurally in contact with the heat conducting member 120 by passing through an opening 151 of the platform 150. The key cap 110 is disposed on the platform 150, and the heat conducting member 120 is clamped between the key cap 110 and the platform 150.

Figure 3A:
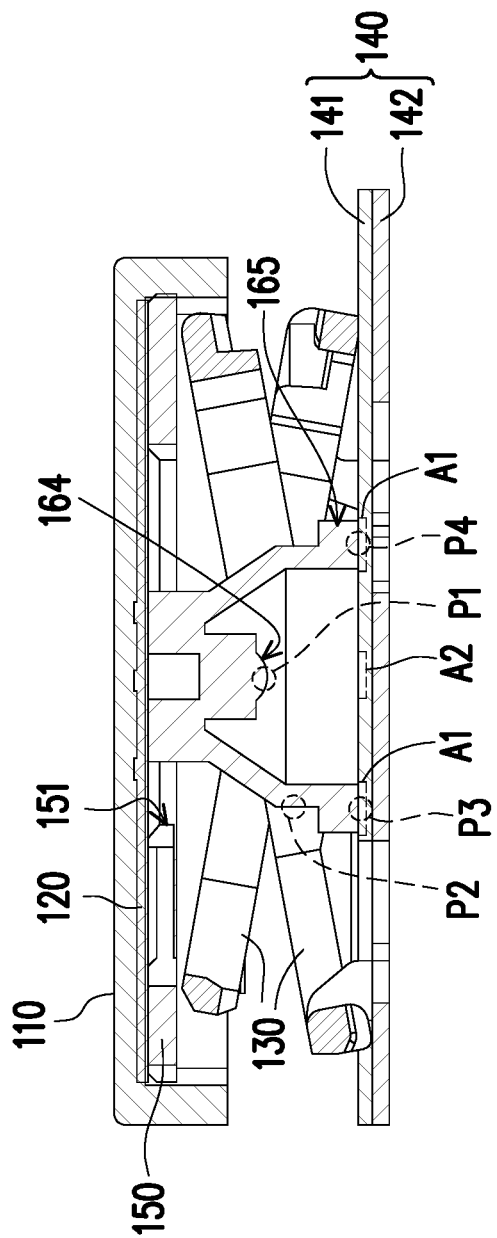
FIG. 3A is a cross-sectional view of the key structure of FIG. 1.

FIG. 3A is a cross-sectional view of the key structure of FIG. 1. With reference to FIG. 2 and FIG. 3A together, the heat conducting member 120 is substantially nested on an inner surface of the key cap 110. In addition, in this embodiment, a material of the heat conducting member 120 includes metal, and a material of the key cap 110 includes plastic, such that the key cap 110 is integrally formed with the heat conducting member 120 by insert molding. Moreover, the key cap 110 and the heat conducting member 120 as manufactured are substantially detachably assembled on the platform 150 with a buckle structure. Accordingly, a user may also disassemble and assemble the key cap 110 and the heat conducting member 120 therein relative to the platform 150, facilitating maintenance or replacement depending on use requirements.

Besides, as mentioned above, since the key structure 100 of this embodiment is disposed in an electronic device, it is inevitable that a part of heat generated by electronic elements inside the electronic device is transferred to the key structure 100. Therefore, the heat is concentrated and accumulated in the key structure 100, and is not easily dissipated. Accordingly, the key structure 100 of this embodiment are provided with the elements disposed as mentioned above, especially the elastic member 160 that is structurally in contact with the heat conducting member 120 by passing through the opening 151 of the platform 150.

FIG. 3B is a schematic enlarged view illustrating the region P1 of FIG. 3A. FIG. 3C is a schematic enlarged view illustrating the region P2 of FIG. 3A. FIG. 3D is a schematic enlarged view illustrating the region P3 of FIG. 3A. FIG. 3E is a schematic enlarged view illustrating the region P4 of FIG. 3A. With reference to FIG. 3A to FIG. 3E together, herein, the elastic member 160 is, for example, a rubber dome, and a structural contact area between the elastic member 160 and the heat conducting member 120 is smaller than an area of the heat conducting member 120. The elastic member 160 includes a body 161 and a heat conducting medium layer 162 disposed outside the body 161. Therefore, heat in the base 140 can be transferred to and evenly diffused in the heat conducting member 120. In other words, since the heat conducting member 120 has a good thermal conductivity coefficient, it is possible to prevent heat from being confined to the contact surface between the heat conducting member 120 and the elastic member 160, and it is even possible for the heat to be dissipated by the heat conducting member 120 to the key cap 110 or the environment where the key cap 110 is located, increasing heat dissipation paths. At the same time, since the heat conducting member 120 achieves better heat conduction, it is possible to prevent heat concentration that may be unfavorable for the user in the tactile sense when operating. In another embodiment not shown, the elastic member 160 may also include an elastic material with a higher thermal conductivity coefficient.

With further reference to FIG. 1 and FIG. 2, in this embodiment, the material of the heat conducting member 120 includes metal, and a surface thereof includes an anodized layer. In addition, the key cap 110 is transparent, and the anodized layer further forms a pattern (or character) 121, which is visible to the user through the transparent key cap 110. In other words, in the key structure 100 of this embodiment, the required pattern or character is not necessary to be formed on the key cap 110, but is instead formed on the heat conducting member 120. In this way, it is possible to prevent the pattern or character from being worn out or falling off the key cap 110 due to long-term use. At the same time, by anodizing the metal in different manufacturing processes, the heat conducting member 120 can be further provided with different colors or glosses, so as to be visually recognizable.

In another embodiment, for the pattern (or character) 121, it is also possible to dispose coating layers of different colors or glosses on the surface of the heat conducting member 120, and then form the required pattern (or character) 121 by a laser engraving process.

As shown in FIG. 3A, the base 140 of this embodiment includes a bracket 142 and a membrane circuit 141, and the scissor structure 130 is pivotally connected to and stands on the bracket 142. With reference to FIG. 3A, FIG. 3B, FIG. 3D, and FIG. 3E together, the elastic member 160 also includes an electrically conducting layer 163 disposed on an inner surface of the body 161, which is substantially disposed on a supporting bottom 165 of the elastic member 160 and a contact bump 164 in a center of the dome. The electrically conducting layer 163 on the supporting bottom 165 bears and is electrically in contact with an electrically conducting pad A1 on the membrane circuit 141. When the user applies a force to press the key structure 100 such that the elastic member 160 is deformed and the contact bump 164 is in contact with an electrically conducting pad A2, the electrically conducting pad A1, the electrically conducting layer 163 of the elastic member 160, and the electrically conducting pad A2 are electrically connected to each other, so as to generate a signal triggered when the key structure 100 is pressed. On the other hand, when the user no longer presses the key structure 100, an accumulated elastic force of the elastic member 160 due to the deformation is sufficient to drive the key cap 110 to be reset in the original position, and restore the contact bump 164 to be suspended above the electrically conducting pad A2.

Figure 4:
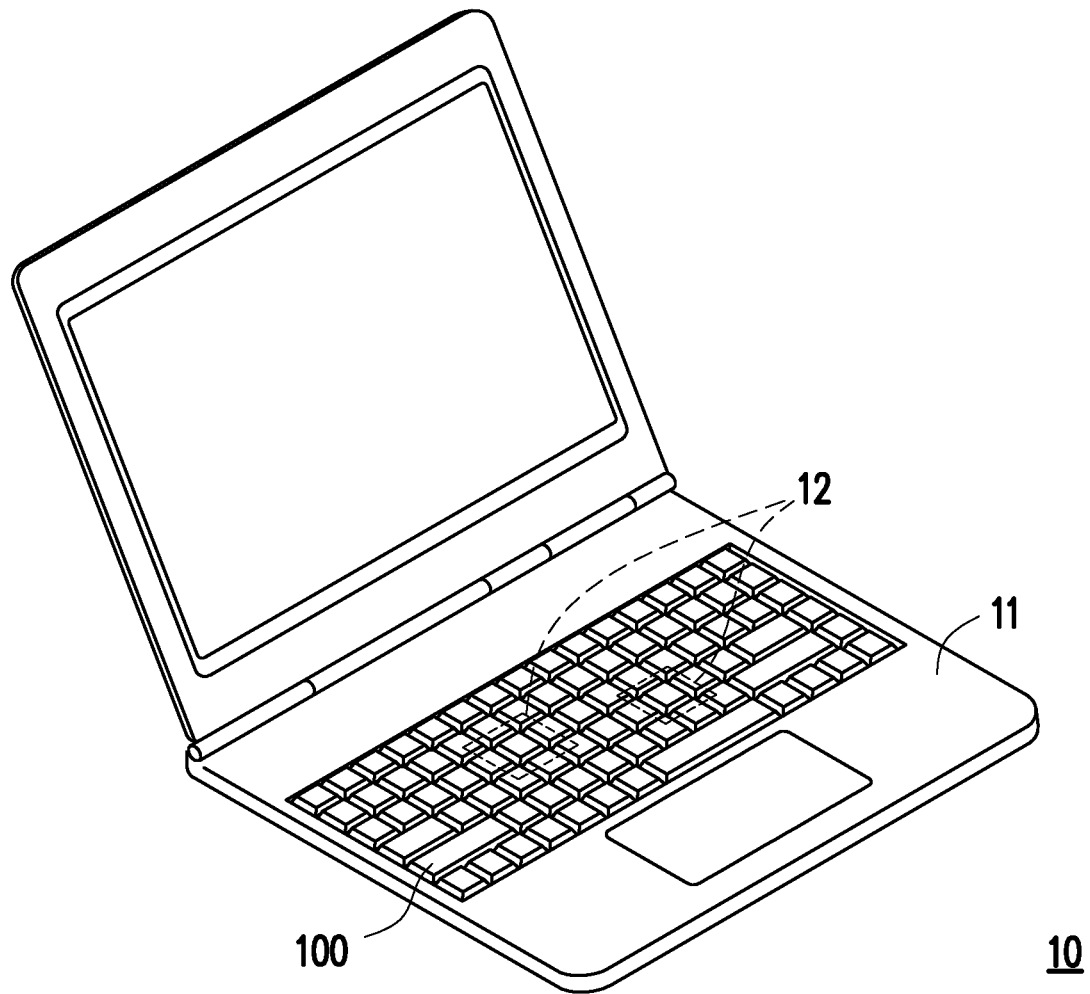
FIG. 4 is a schematic diagram of a portable electronic device according to an embodiment of the disclosure.

FIG. 4 is a schematic diagram of a portable electronic device according to an embodiment of the disclosure. With reference to FIG. 4 and cross-reference to FIG. 1, in this embodiment, the key structure 100 is adapted for a portable electronic device 10, for which a notebook computer being taken as an example herein. The portable electronic device 10 includes a body 11 and at least one heat source 12 (two heat sources 12 are shown herein as an example, such as but not limited to a central processing unit CPU and a graphics processing unit GPU in a system of the notebook computer). The heat source 12 is disposed in the body 11, and the key structure 100 is disposed on the body 11. A part of heat generated by the heat source 12 will be transferred to the base 140 of the key structure 100. Since the elastic member 160 includes the heat conducting medium layer 162, heat transferred to the base 140 can be smoothly transferred to the heat conducting member 120 through the heat conducting medium layer 162.

In summary of the foregoing, in the foregoing embodiments of the disclosure, the platform and the heat conducting member are further disposed between the elastic member and the key cap of the key structure. The elastic member is disposed on the base and is structurally in contact with the heat conducting member by passing through the opening of the platform, and therefore the heat at the base can be smoothly transferred to the heat conducting member through the elastic member. The scissor structure and platform form the basic structure to support the heat conducting member and the key cap.

Accordingly, when the heat generated by the heat source disposed in the body of the portable electronic device is transferred to the base of the key structure, the heat can be transferred to the heat conducting member through the heat conducting medium layer on the outer surface of the elastic member. In addition, since the heat conducting member has a better thermal conductivity coefficient and the area thereof is larger than the contact area between the elastic member and the heat conducting member, the heat transferred to the heat conducting member is concentrated on the contact surface between the elastic member and the heat conducting member, improving the hot spots as mentioned above. The key structure thus have an aesthetic appearance. At the same time, with the heat conducting member being in contact with the elastic member, heat is homogenized and then dissipated into the space where the key structure is located.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A key structure, comprising:
a base;
a platform;
a scissor structure movably pivoted between the base and the platform;
a heat conducting member disposed on the platform;
an elastic member disposed on the base and structurally in contact with the heat conducting member by passing through an opening of the platform; and
a key cap disposed on the platform, wherein the heat conducting member is clamped between the key cap and the platform,
wherein the key structure is adapted for a portable electronic device, the portable electronic device comprises a body and at least one heat source, wherein the at least one heat source is disposed in the body, the key structure is disposed on the body, and a part of heat generated by the at least one heat source is transferred to the base of the key structure, wherein the elastic member comprises a heat conducting medium layer to transfer the heat transferred to the base to the heat conducting member.

2. The key structure according to claim 1, wherein a structural contact area between the elastic member and the heat conducting member is smaller than an area of the heat conducting member.

3. The key structure according to claim 1, wherein a surface of the heat conducting member comprises an anodized layer, and the key cap is transparent.

4. The key structure according to claim 1, wherein a pattern is present on a surface of the heat conducting member, and the key cap is transparent.

5. The key structure according to claim 4, wherein the surface of the heat conducting member comprises a coating layer, and the coating layer forms the pattern by laser engraving.

6. The key structure according to claim 1, wherein the heat conducting member is nested on an inner surface of the key cap.

7. The key structure according to claim 1, wherein a material of the heat conducting member comprises metal, a material of the key cap comprises plastic, and the key cap is integrally formed with the heat conducting member by insert molding.

* * * * *